(12) United States Patent
Urita et al.

(10) Patent No.: US 12,351,895 B2
(45) Date of Patent: Jul. 8, 2025

(54) ALUMINUM ALLOY FASTENING MEMBER, FASTENER CHAIN AND METHOD FOR PRODUCING ALUMINUM ALLOY FASTENING MEMBER

(71) Applicant: YKK CORPORATION, Tokyo (JP)

(72) Inventors: Yuki Urita, Toyama (JP); Atsushi Ogihara, Toyama (JP); Shigeru Tsuchida, Toyama (JP); Chikako Hiromi, Toyama (JP); Ryota Ara, Toyama (JP); Sohei Nagasawa, Kanagawa (JP); Mitsuomi Katori, Kanagawa (JP); Misako Hosaka, Kanagawa (JP)

(73) Assignee: YKK Corporation, Tokyo (JP)

( * ) Notice: Subject to any disclaimer, the term of this patent is extended or adjusted under 35 U.S.C. 154(b) by 170 days.

(21) Appl. No.: 17/367,045

(22) Filed: Jul. 2, 2021

(65) Prior Publication Data
US 2022/0002878 A1 Jan. 6, 2022

(30) Foreign Application Priority Data
Jul. 6, 2020 (JP) .................................. 2020-116565

(51) Int. Cl.
*C22C 21/08* (2006.01)
*A44B 19/04* (2006.01)
(Continued)

(52) U.S. Cl.
CPC ............ *C22C 21/08* (2013.01); *B32B 15/016* (2013.01); *C23C 22/66* (2013.01); *A44B 19/04* (2013.01)

(58) Field of Classification Search
CPC ........ C23C 22/66; B32B 15/016; A44B 19/04
(Continued)

(56) References Cited

U.S. PATENT DOCUMENTS 3,960,676 A * 6/1976 Miyosawa ............. C25D 11/00
205/172
2018/0298497 A1* 10/2018 Yasuda ................... C23C 22/66
(Continued)

FOREIGN PATENT DOCUMENTS

DE       102020003684 A1    12/2020
EP           3560370 A1 *   10/2019   ............... A44B 1/04
(Continued)

OTHER PUBLICATIONS

Total Materia, "Aluminum-Magnesium-Silicon (6000) Alloys", Aug. 6, 2016, URL: <https://web.archive.org/web/20160806212149/https://www.totalmateria.com/page.aspx?ID=CheckArticle&site=ktn&NM=74>, pp. 1-5 (Year: 2016).*
(Continued)

*Primary Examiner* — Katherine A Christy
(74) *Attorney, Agent, or Firm* — Procopio, Cory, Hargreaves & Savitch LLP (57) ABSTRACT

An aluminum alloy fastening member has a novel chemical includes conversion coating as a colored coating, a fastener chain. A method producing the aluminum alloy fastening member. The aluminum alloy fastening member includes a chemical conversion coating containing manganese as a component element, and the chemical conversion coating satisfies hue ranges of $-3 \leq a^* \leq 12$, $-5 \leq b^* \leq 35$, and $45 \leq L^* \leq 80$ in a CIELAB color space as defined by JIS Z 8781-4 (2013).

7 Claims, 2 Drawing Sheets

(51) Int. Cl.
  *B32B 15/01* (2006.01)
  *C23C 22/66* (2006.01)
(58) Field of Classification Search
  USPC ..................................................... 428/472.2
  See application file for complete search history.

(56) References Cited

U.S. PATENT DOCUMENTS

| | | |
|---|---|---|
| 2020/0399762 A1 | 12/2020 | Urita et al. |
| 2021/0388505 A1 | 12/2021 | Yarino et al. |

FOREIGN PATENT DOCUMENTS

| | | | |
|---|---|---|---|
| JP | S54-107438 A | 8/1979 | |
| JP | S57-93003 A | 6/1982 | |
| JP | S60110895 A | 6/1985 | |
| JP | 2002180275 A | 6/2002 | |
| JP | 2003253480 A | 9/2003 | |
| JP | 6004217 B1 | 10/2016 | |
| WO | WO-2018122935 A1 * | 7/2018 | ............... A44B 1/04 |
| WO | 2020013304 A1 | 1/2020 | |
| WO | 2020049695 A1 | 3/2020 | |

OTHER PUBLICATIONS

Total Material, "Aluminum-Magnesium (5000) Alloys", May 2003: URL: <https://www.totalmateria.com/Article75.htm>, pp. 1-5 (Year: 2003).*

Indian Office Action of related Application No. 202114022261, mailed May 6, 2022, 6 pages.

Office Action of German application No. 102021003298.5 issued on Mar. 5, 2025.

* cited by examiner

ALUMINUM ALLOY FASTENING MEMBER, FASTENER CHAIN AND METHOD FOR PRODUCING ALUMINUM ALLOY FASTENING MEMBER

FIELD OF THE INVENTION

The present invention relates to an aluminum alloy fastening member, a fastener chain and a method for producing an aluminum alloy fastening member.

BACKGROUND OF THE INVENTION

Conventionally, in coloring of an aluminum alloy, it is known to adsorb a dye onto an anodized coating or an anodic oxidation coating.

For example, Patent Literature 1 discloses a method for electrolytically coloring an aluminum alloy, comprising forming a coating structure capable of electrolytic coloring, from a colored coating formed on a base surface of the aluminum alloy due to electrolytic coloring or spontaneous coloring; and then carrying out electrolytic coloring to superimpose the colors to obtain a coating having a new color tone. It also discloses that according to such a structure, it is possible to obtain various color tones including various intermediate colors, which would not otherwise be obtained by the conventional electrolytic coloring method.

CITATION LIST

Patent Literatures

[Patent Literature 1] Japanese Patent Application Publication No. S60-110895 A

SUMMARY OF THE INVENTION

In the technique of coloring the aluminum alloy as disclosed in Patent Literature 1, the colored chemical conversion coating is formed in an organic acid bath such as malonic acid, maleic acid, oxalic acid, and sulfosalicylic acid, or in a bath obtained by adding a metal salt such as Sn, Mn, Co, and Cu to sulfuric acid. It also discloses that nickel sulfate is specifically used as the metal salt in Examples.

Conventionally, the surface of the aluminum alloy is thus colored by forming the chemical conversion coating using various metal salts. However, there is still room for further development of a surface coloring technique for an aluminum alloy.

An object of the present invention is to provide an aluminum alloy fastening member including a novel chemical conversion coating as a colored coating, a fastener chain, and a method for producing the aluminum alloy fastening member.

In an aspect, the present invention relates to an aluminum alloy fastening member comprising a chemical conversion coating containing manganese as a component element, wherein the chemical conversion coating satisfies hue ranges of $-3 \leq a^* \leq 12$, $-5 \leq b^* \leq 35$, and $45 \leq L^* \leq 80$ in a CIELAB color space as defined by JIS Z 8781-4 (2013).

In an embodiment of the aluminum alloy fastening member according to the present invention, the chemical conversion coating satisfies hue ranges of $0 \leq a^* \leq 10$, $5 \leq b^* \leq 25$, and $45 \leq L^* \leq 60$ in a CIELAB color space as defined by JIS Z 8781-4 (2013).

In another embodiment of the aluminum alloy fastening member according to the present invention, the chemical conversion coating comprises a manganese element in an amount of more than 0% by mass and 35% by mass or less.

In still another embodiment of the aluminum alloy fastening member according to the present invention, the chemical conversion coating has an average thickness of 0.05 μm or more and 3.00 μm or less.

In still another embodiment, the aluminum alloy fastening member according to the present invention comprises a clear coating on the chemical conversion coating, and the clear coating has an average thickness of 1.0 μm or more and 40 μm or less.

In still another embodiment of the aluminum alloy fastening member according to the present invention, the aluminum alloy has a composition represented by a general formula: $Al_a Si_b Mg_c$, in which each of a, b, c is % by mass; the symbol a is the balance; $0.1 \leq b \leq 1.5$; $0.2 \leq c \leq 5.6$; and unavoidable impurities may be contained.

In still another embodiment, the aluminum alloy fastening member according to the present invention is elements for slide fasteners, a slider for slide fasteners, a stopper for slide fasteners, or a button.

In another aspect, the present invention relates to a fastener chain, comprising: the aluminum alloy fastening member according to the embodiment of the present invention; and fastener tapes made of a plurality of threads, wherein the aluminum alloy fastening member is elements for slide fasteners, and the elements for slide fasteners are attached to the fastener tapes, and wherein an amount of the manganese element remaining in the fastener tapes is less than 90 ppm.

In another aspect, the present invention relates to a method for producing the aluminum alloy fastening member according to the embodiment of the present invention, comprising a step of forming a chemical conversion coating containing manganese as a component element by immersing the aluminum alloy fastening member in a metal coloring solution for chemical conversion treatment, the metal coloring solution comprising permanganic acid or a slat thereof, and one or both of an inorganic acid and a salt thereof, and a condensed phosphate.

In one embodiment of the method for producing the aluminum alloy fastening member according to the present invention, the permanganate or the salt thereof is permanganic acid, sodium permanganate, potassium permanganate, zinc permanganate, magnesium permanganate, calcium permanganate, ammonium permanganate, or a combination thereof.

According to the present invention, it is possible to provide an aluminum alloy fastening member having a novel chemical conversion coating as a colored coating, a fastener chain, and a method for producing the aluminum alloy fastening member.

DETAILED DESCRIPTION OF THE INVENTION

Hereinafter, embodiments of an aluminum alloy fastening member, a fastener chain and a method for the aluminum alloy fastening member according to the present invention will be described with reference to the drawings. However, the present invention is not limited to the embodiments, and various changes, modifications, and improvements may be added without departing from the scope of the present invention, based on knowledge of those skilled in the art.

[Aluminum Alloy Fastening Member]

An aluminum alloy fastening member according to an embodiment of the present invention includes a chemical conversion coating containing manganese as a component element on a surface of the fastening member formed of an aluminum alloy. The chemical conversion coating containing the manganese as the component element can form a colored coating, resulting in a colored surface of the fastening member formed of the aluminum alloy.

<Aluminum Alloy>

Examples of the aluminum alloy that is a material for the fastening member include an Al—Si—Mg alloy, an Al—Cu—Mg alloy, an Al—Mn alloy, an Al—Si alloy, an Al—Mg alloy, and an Al—Zn—Mg alloy. In the aluminum alloy fastening member according to an embodiment of the present invention, it is particularly preferable to use an Al—Si—Mg alloy as the aluminum alloy, and it is more preferable to use an Al—Mg alloy. More particularly, the aluminum alloy preferably has a composition represented by the general formula: $Al_aSi_bMg_c$, in which each of a, b, c is % by mass; the symbol a is the balance; $0.1 \leq b \leq 1.5$; $0.2 \leq c \leq 5.6$; and unavoidable impurities may be contained.

Si has an effect of forming an extremely small intermetallic compound with Mg by solid solution of Si in an Al matrix and then carrying out an aging heat treatment, resulting in improvement of mechanical properties (strength and hardness) of the alloy. When the composition ratio of Si is 0.1% by mass or more, the strength and hardness of the aluminum alloy are preferably improved. When the composition ratio of Si is 1.5% by mass or less, coarse precipitation or crystallization of Si itself can be suppressed, elongation in plastic deformation can increases, resulting in improved workability. The composition ratio (b) of Si is more preferably 0.25 (% by mass)$\leq b \leq$0.9 (% by mass), that is, 0.25% by mass or more and 0.9% by mass or less, and even more preferably 0.25% by mass or more and less than 0.35% by mass.

Mg has an effect of forming an extremely small intermetallic compound with Si by a heat treatment, resulting in improved mechanical properties (strength and hardness) of the alloy. Further, it has an effect of improving mechanical properties (strength and hardness) of the alloy by solid solution in Al as a matrix. The composition ratio (c) of Mg is preferably 0.8 (% by mass)$\leq c \leq$5.6 (% by mass), that is, 0.8% by mass or more and 5.6% by mass or less, and more preferably 4.5% by mass or more and 5.6% by mass or less. When an appropriate amount of Mg is added, softening in a heating step (washing, drying, or the like) after cold working can be prevented. In particular, any movement of a dislocation introduced by the cold rolling is prevented by atoms (Mg) precipitated in the Al matrix due to the aging heat treatment, so that a decrease in strength due to the heat treatment can be suppressed.

The unavoidable impurities refer to acceptable impurities, because although they are present in raw materials or unavoidably mixed in production steps and are essentially unnecessary, they are present in a minor amount and do not affect properties. In the present invention, the content of each of impurity elements acceptable as the unavoidable impurities is generally 0.1% by mass or less, and preferably 0.05% by mass or less.

<Chemical Conversion Coating>

Manganese contained as a component element of the chemical conversion coating on the aluminum alloy fastening member according to an embodiment of the present invention may be contained as simple manganese (Mn) and/or a manganese compound. The manganese compound may be manganese oxide. The content of manganese and/or the manganese compound in the chemical conversion coating can be appropriately adjusted depending on a desired color tone. In general, as the content of manganese and/or manganese compound in the chemical conversion coating is higher, the color tone will be darker, and as the content is lower, the color tone will be lighter. The chemical conversion coating on the aluminum alloy fastening member according to an embodiment of the present invention may contain a manganese element in an amount of more than 0% by mass and 35% by mass or less, or 10% by mass or more and 30% by mass or less.

The aluminum alloy fastening member according to the embodiment of the present invention satisfies hue ranges of $-3 \leq a^* \leq 12$; $-5 \leq b^* \leq 35$; and $45 \leq L^* \leq 80$ in a CIELAB color space as defined in JIS Z 8781-4 (2013). It should be noted that the symbol $a^*$ is a value indicating a magenta-green color tone (plus (+) is magentaish, and minus (−) is greenish), and the symbol $b^*$ is a value indicating a yellow-blue color tone (plus (+) is yellowish, and minus (−) is blueish). The symbol $L^*$ shows lightness, and as its value is higher, the glossiness will be higher. A yellowish to brownish color tone can be obtained by forming a chemical conversion coating that satisfies the above hue ranges on the surface of the fastening member made of the aluminum alloy.

In the aluminum alloy fastening member according to an embodiment of the present invention, the chemical conversion coating preferably satisfies hue ranges of $0 \leq a^* \leq 10$; $5 \leq b^* \leq 25$; and $45 \leq L^* \leq 60$ in a CIELAB color space as defined in JIS Z 8781-4 (2013), because they improve aesthetic appearance.

The chemical conversion coating on the aluminum alloy fastening member according to an embodiment of the present invention preferably has an average thickness of 0.05 or more and 3.00 μm or less. The average thickness of the chemical conversion coating can be evaluated by the following method. First, a cross section of a region presenting the yellowish to brownish color tone in the chemical conversion coating is polished by a conventional method, and then observed with an electron microscope such as an SEM to select arbitrary five points at equal intervals (for example, an interval of 1 μm from each other). The thicknesses of the chemical conversion coating at the five points are then measured, and an average value of them is calculated to determine it to be the average thickness in the region presenting the yellowish to brownish color tone. If the average thickness of the chemical conversion coating is less than 0.05 μm, the color of the base material will appear on the surface because of the lower thickness, so that the silver color will be presented. When the average thickness of the chemical conversion coating is 0.05 μm or more, the desired yellowish to brown color tone can be more reliably developed on the surface of the aluminum alloy fastening member. When the average thickness of the chemical conversion coating is 3.00 μm or less, costs required for forming the chemical conversion coating can be suppressed while more reliably developing the desired yellowish to brownish color tone on the surface of the aluminum alloy fastening member. The average thickness of the chemical conversion coating is more preferably 0.1 μm or more and 2.0 μm or less.

The aluminum alloy fastening member according to the embodiment of the present invention includes a clear coating on the chemical conversion film, and the clear coating preferably has an average thickness of 1.0 μm or more and 40 μm or less. The average thickness of the clear coating of 1.0 μm or more can provide good color tone retention (durability) of the chemical conversion coating. The average thickness of the clear coating of 40 μm or less can allow a change in the color tone of the chemical conversion coating to fall within an allowable range even if the clear coating is provided. The average thickness of the clear coating is more preferably 3.0 μm or more and 20 μm or less. The clear coating is a transparent coating. Materials forming the clear coating are not particularly limited, and known materials may be used. For example, the clear coating may be formed of a known resin material such as epoxy, acrylic, urethane, or alkyd resins.

The aluminum alloy fastening member according to an embodiment of the present invention may be elements for slide fasteners, a slider for slide fasteners, a stopper for slide fasteners, or a button.

<Elements for Slide Fasteners, Slider for Slide Fasteners, Stopper for Slide Fasteners, or Button>

Figure 1:
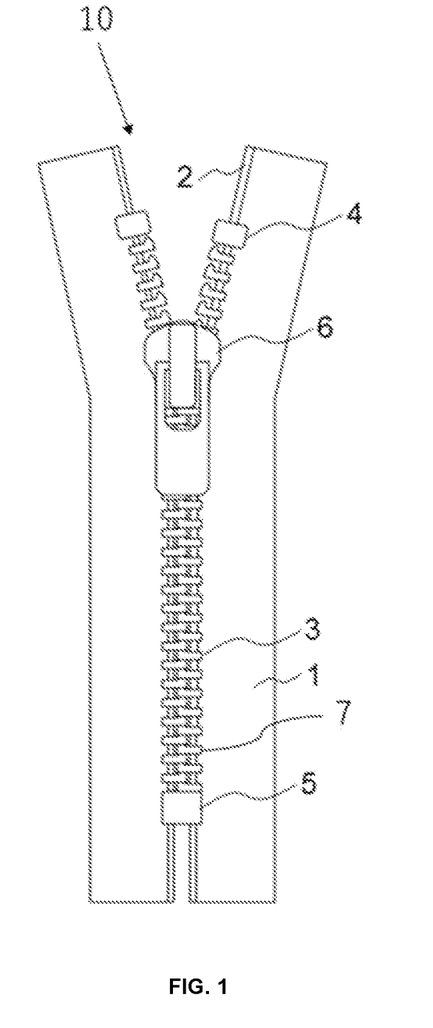
FIG. 1 is a schematic external view of a slide fastener according to an embodiment of the present invention.

FIG. 1 is a schematic external view of a slide fastener 10 according to an embodiment of the present invention. The slide fastener 10 as shown in FIG. 1 merely illustrates one embodiment of the present invention, and is not limited to this structure. The slide fastener 10 includes: a pair of fastener tapes 1 each having a core portion 2 formed on one side end side; elements 3 (elements for slide fasteners) which are each fixed by means of caulking (attached) to the core portion 2 of each fastener tape 1 at predetermined intervals; upper stoppers 4 (upper stoppers for slide fasteners) and a lower stopper 5 (a lower stopper for slide fasteners) fixed by means of caulking to the core portions 2 of the fastener tapes 1 at upper and lower ends of the elements 3, respectively; a slider 6 (a slider for slide fasteners) provided between a pair of opposing rows of the elements 3 and slidable in a up and down direction for engaging and disengaging the elements 3. It is to understand that a member in which the elements 3 are attached to the core portion 2 of one fastener tape 1 is referred to as a slide fastener stringer, and a member in which the elements 3 attached to the core portions 2 of the pair of fastener tapes 1 have been engaged is referred to as a slide fastener chain 7. By thus using the aluminum alloy fastening members according to an embodiment of the present invention as the elements 3 (slide fastener chain 7), the slider 6, the upper stoppers 4, and the lower stopper 5 for the slide fastener 10, the elements (slide fastener chain), the slider, and the stoppers for the slide fastener can be colored as desired, and for example, a yellowish to brownish color tone can be developed to produce a slide fastener having improved aesthetic appearance.

As described above, the fastener chain 7 according to the embodiment of the present invention includes: the elements 3 (aluminum alloy fastening member) according to the embodiment of the present invention; and the fastener tapes 1, and has a structure in which the elements 3 are attached to the fastener tapes 1. Here, when the fastener tapes 1 have a fibrous structure composed of a plurality of threads, the manganese element remaining in the fastener tape is controlled to be less than 90 ppm, and preferably 40 ppm or less.

Figure 2:
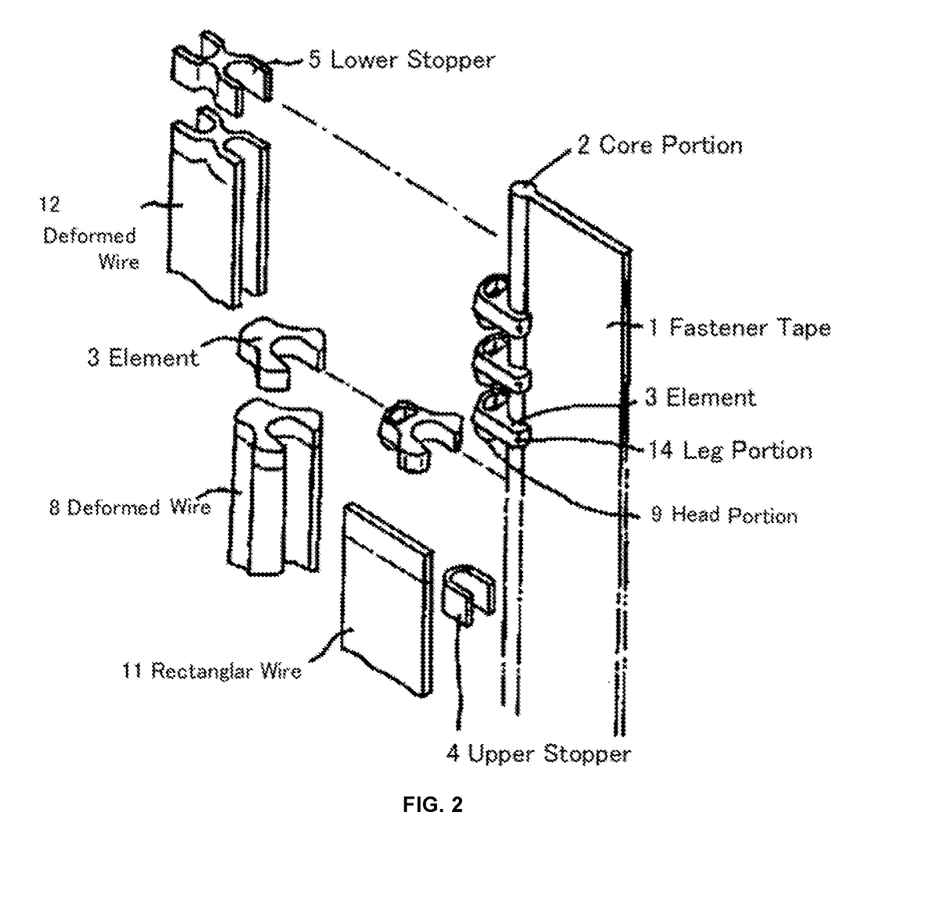
FIG. 2 is a schematic view showing a method for producing elements, an upper stopper and a lower stopper for the slide fastener as shown in FIG. 1, and a method of attaching them to a core portion of a fastener tape.

FIG. 2 is a schematic view showing a method for producing the elements 3, the upper stoppers 4 and the lower stopper 5 for the slide fastener as shown in FIG. 1 and how to attach these members to the core portion 2 of the fastener tape 1. As shown in FIG. 2, the elements 3 are formed by cutting a metallic deformed wire 8 having a substantially Y-shaped cross section into pieces each having predetermined dimensions, and pressing each piece to form an engaging head portion 9, and then attached to the core portion 2 by caulking both leg portions 14 onto the core portion 2 of the fastener tape 1. The upper stopper 4 is formed by cutting a metallic rectangular wire 11 having a rectangular cross section into pieces each having predetermined dimensions, and bending the pieces to form a substantially C-shaped cross section, and then attached to the core portion 2 by caulking each piece onto the core portion 2 of the fastener tape 1. The lower stopper 5 is formed by cutting a metallic deformed wire 12 having a substantially X-shaped cross section 12 into pieces each having predetermined dimensions, and then attached to the core portion 2 by caulking each piece onto the core portion 2 of the fastener tape 1. In addition, FIG. 2 shows that the elements 3, the upper stopper 4 and the lower stopper 5 are simultaneously attached to the fastener tape 1. However, actually, the elements 3 are first attached intermittently to certain regions of the fastener tape 1 to form a fastener stringer, and opposing element rows of a pair of fastener stringers are engaged to each other to produce a fastener chain. The predetermined upper or lower stopper 4,5 is then attached in a region having no element 3 in the fastener chain.

The use of the aluminum alloy fastening member according to an embodiment of the present invention is not limited to the slide fastener, and it can also be applied to a snap fastener and other members for metal fasteners. Further, the aluminum alloy fastening member according to an embodiment of the present invention may be a button. The form of the button is not particularly limited, and it can be applied to a known button.

[Method for Producing Aluminum Alloy Fastening Member]

Next, a method for producing the aluminum alloy fastening member according to an embodiment of the present invention will be described in detail. First, a bath is prepared that contains a metal coloring solution for chemical conversion treatment, which contains permanganic acid or a slat thereof, and one or both of an inorganic acid and a salt thereof, and a condensed phosphate. The aluminum alloy fastening member to be treated is then immersed in the metal coloring solution for chemical conversion treatment while controlling a temperature of the metal coloring solution for chemical conversion treatment in the bath. After a certain period of time, the metal to be treated is pulled up from the bath, so that a chemical conversion coating which is a colored coating is formed on the surface, and an aluminum alloy fastening member developed into a desired color tone is obtained. Thus, according to the method for producing the aluminum alloy fastening member according to the embodiment of the present invention, only by immersing the aluminum alloy fastening member to be treated in the metal coloring solution for chemical conversion treatment, which contains permanganic acid or the slat thereof, and one or both of the inorganic acid and the salt thereof, and the condensed phosphate, a desired color tone can be obtained. Therefore, when coloring the surface of the aluminum alloy fastening member, it is not necessary to form an oxide film on the surface of the aluminum alloy fastening member, and it is not necessary to perform coloring by electrolysis, thereby improving the treatment efficiency.

Further, in the method for producing the aluminum alloy fastening member according to the embodiment of the present invention, the surface of the aluminum alloy fastening member may be colored, for example by bringing the metal coloring solution for chemical conversion treatment into contact with the surface, for example in a step of spraying the metal coloring solution for chemical conversion treatment, in addition to the immersion of the aluminum alloy fastening member to be treated in the metal coloring solution for chemical conversion treatment.

<Metal Coloring Solution for Chemical Conversion Treatment>

(Permanganic Acid or Salt Thereof)

Examples of permanganic acid or the salt thereof in the metal coloring solution for chemical conversion that can be used include permanganic acid, sodium permanganate, potassium permanganate, zinc permanganate, magnesium permanganate, calcium permanganate, ammonium permanganate, or a combination thereof. Further, as the permanganic acid or the salt thereof, sodium permanganate and potassium permanganate are more preferable.

The content of the permanganate in the metal coloring solution for chemical conversion treatment can be, for example, from 0.5 to 50 g/L, although it depends on types of metals to be treated and a degree of a yellowish to brownish color tone. Basically, a lower content of the permanganate can allow the metal surface to be colored into a lighter yellowish to darker yellowish color tone. Further, a higher content of the permanganate can allow the metal surface to be colored into a lighter brownish to darker brownish color tone. The content of permanganate is more preferably from 1 to 30 g/L, and more preferably from 2 to 20 g/L.

As will be described later, the metal coloring solution for chemical conversion treatment may contain an oxo acid or a salt thereof. However, for a metal coloring solution for chemical conversion treatment that does not contain these components, the surface of the metal such as aluminum or an aluminum alloy can be colored into a yellowish to brownish color tone that can provide further improved aesthetic appearance.

(Inorganic Acid or Salt Thereof)

The inorganic acid and the salt thereof in the metal coloring solution for chemical conversion treatment are preferably phosphoric acid, sulfuric acid, nitric acid, carbonic acid, hydrochloric acid, and salts thereof, or combinations thereof. The salts of phosphoric acid, sulfuric acid, nitric acid, carbonic acid, and hydrochloric acid that can be used include metal salts or ammonium salts of those acids. Further, as the inorganic acid and the salt thereof, trisodium phosphate, nitric acid, copper nitrate and zinc chloride are more preferable.

The content of the inorganic acid and the salt thereof in the metal coloring solution for chemical conversion treatment can be, for example, from 0.5 to 100 g/L, although it depends on types of metals to be treated and a coloring degree of a yellowish to brownish color tone. Basically, a lower content of the inorganic acid and the salt thereof can allow the metal surface to be colored into a lighter yellowish to darker yellowish color tone. Further, a higher content of the inorganic acid and the salt thereof can allow the metal surface to be colored into a lighter brownish to darker brownish color tone. The content of the inorganic acid and the salt thereof is more preferably from 1 to 30 g/L, and more preferably 2 to 20 g/L.

(Condensed Phosphate)

The condensed phosphate in the metal coloring solution for chemical conversion treatment is preferably potassium pyrophosphate, sodium tripolyphosphate, or a combination thereof. The content of the condensed phosphate can be, for example, from 1 to 150 g/L, although it depends on types of metals to be treated and a coloring degree of a yellowish to brownish color tone. Basically, a lower content of the condensed phosphate can make the metal surface to be colored into a lighter yellowish to darker yellowish color tone. Further, a higher content of the condensed phosphate can allow the metal surface to be colored into a lighter brownish to darker brownish color tone. The content of the condensed phosphate is more preferably from 3 to 50 g/L, and more preferably from 4 to 40 g/L.

(Oxo Acid or Salt Thereof)

The metal coloring solution for chemical conversion treatment may further contain an oxo acid or a salt thereof. Even if the metal coloring solution for chemical conversion treatment contains the oxo acid or salt thereof, the surface of the above metal to be treated can be colored into a yellowish to brownish color tone with good treatment efficiency. Further, the metal coloring solution for chemical conversion treatment contains the oxo acid or the salt thereof, so that the surface of metal such as copper, copper alloys, iron, iron alloys, zinc, and zinc alloys can be colored into a yellowish to brownish color tone that can provide more improved aesthetic appearance.

The oxo acid or the salt thereof may preferably be perchloric acid, chloric acid, chlorous acid, hypochlorous acid, bromic acid, boric acid, or salts thereof, or combinations thereof. The salts of perchloric acid, chloric acid, chlorous acid, hypochlorous acid, bromic acid, and boric acid that can be used include metal salts or ammonium salts of those acids.

The total content of the oxo acid or salt thereof in the metal coloring solution for chemical conversion treatment can be from 0.5 to 100 g/L. Basically, as the total content of the oxo acid or the salt thereof is lower, the surface of the metal can be colored into a lighter yellowish to darker yellowish color tone. Further, as the total content of the oxo acid or the salt thereof is higher, the surface of the metal can be colored into a lighter brownish to darker brownish color tone. The total content of the oxo acid or the salt thereof is more preferably from 1 to 50 g/L, and even more preferably from 10 to 30 g/L.

(Aqueous Medium)

The metal coloring solution for chemical conversion treatment may be a mixture of the various components as described above and an aqueous medium. The aqueous medium refers to a medium containing water as a main component. Examples of the aqueous medium include a medium containing water as a main component and an organic solvent such as an alcohol miscible with water. During the preparation of the metal coloring solution for chemical conversion treatment according to an embodiment of the present invention, during storage of the metal coloring solution for chemical conversion treatment, or after coloring of the surface of the metal, the aqueous medium may optionally contain various components that advantageously act to improve any property of the colored surface of the metal, or various components that do not substantially inhibit the effects of the present invention. Specific examples of these components include pH adjusting agents, storage stabilizers and the like.

<Treatment Temperature>

A treatment temperature with the metal coloring solution for chemical conversion treatment is preferably in a range of from 10 to 80° C., and more preferably in a range of from 10 to 60° C., and even more preferably in a range of from 30 to 60° C. When the treatment temperature is 10° C. or more, a reaction velocity of the surface treatment increases, and when the treatment temperature is 80° C. or less, a decrease in a liquid level of the metal coloring solution for chemical conversion treatment due to evaporation can be suppressed.

<Treatment Time>

A treatment time with the metal coloring solution for chemical conversion treatment is preferably in a range of from 30 seconds to 20 minutes, and more preferably in a range of from 1 minute to 20 minutes, and even more preferably in a range of from 1 minute to 10 minutes. Basically, as the treatment time is shorter, the surface of the metal can be colored into a lighter yellowish to darker yellowish color tone. Further, as the treatment time is longer, the surface of the metal can be colored into a lighter brownish to darker brownish color tone.

<Pre-Treatment>

When carrying out the metal surface treatment, the aluminum alloy fastening member can be previously degreased, activated, or surface-adjusted to improve the appearance, corrosion resistance of the aluminum alloy fastening member and reactivity of the aluminum alloy fastening member with the metal coloring solution for chemical conversion treatment.

<Post-Treatment>

After the metal surface treatment, a post-treatment may be carried out with coating agents containing one or more selected from the group consisting of silicon, a resin and a wax. These coating agents are not particularly limited as long as they do not affect the desired color tone on the surface of the aluminum alloy fastening member, and include coating agents containing resins such as acrylic resins, olefin resins, alkyd resins, urea resins, epoxy resins, melamine resins, fluororesins, polyethylene, polyvinyl chloride, polystyrene, polypropylene, methacrylic resins, phenolic resins, polyester resins, polyurethane, polyamide, and polycarbonate, and silicates, colloidal silica or the like. The concentration of those resins is preferably from 0.01 to 800 g/L, although the appropriate concentration varies depending on the type of resins.

EXAMPLES

Hereinafter, while Examples of the present invention will be described, these Examples are provided for better understanding of the present invention, and are not intended to limit the present invention.

[Coloring Test for Fastener Chain]

Test Example 1

As samples of Test Example 1, each slide fastener chain obtained by attaching A5056 aluminum alloy elements having an alloy composition as shown in Test Example 1 of Table 1, as defined in JIS H 4040: 2015, to fastener tapes made of plurality of threads was prepared for each treatment condition, and analyzed for twelve elements continuous with each other. Table 1 shows its average value. The size of each aluminum alloy element on the surface where the fastener tape extended was 4.0 mm$^2$.

The surface of each sample was then degreased and washed with water in this order.

A bath containing a metal coloring solution for chemical conversion treatment having a solution composition of 30 g/L of potassium permanganate was prepared, and the pH was adjusted to the value shown in Table 1. Pure water was used as the aqueous medium of the metal coloring solution for chemical conversion treatment.

Each sample was then immersed in the metal coloring solution for chemical conversion treatment in a state where the metal coloring solution in the bath was controlled at each temperature as shown in Table 1. After immersion for each time as shown in Table 1, each sample was removed.

Subsequently, the surface of each sample was washed with water and then dried.

Test Example 2

As samples of Test Example 2, each slide fastener chain obtained by attaching aluminum alloy elements having an alloy composition as shown in Test Example 2 of Table 1 to the same fastener tapes as those of Test Example 1 was prepared, and twelve elements continuous with each other were analyzed. Table 1 shows its average value. The size of each aluminum alloy element on the surface where the fastener tape extended was 4.0 mm$^2$. A bath containing the same metal coloring solution for chemical conversion treatment as that of Test Example 1 was then prepared, and each sample was immersed in the bath under the same conditions as those of Test Example 1, and then removed.

Subsequently, the surface of each sample was washed with water and then dried.

Test Example 3

As a sample of Test Example 3, a slide fastener chain obtained by attaching aluminum alloy elements having an alloy composition as shown in Test Example 3 of Table 1 to the same fastener tapes as those of Test Example 1 was prepared, and twelve elements continuous with each other were analyzed. Table 1 shows its average value. The size of the aluminum alloy element on the surface where the fastener tape extended was 4.0 mm$^2$. The slide fastener chain was then placed in a sulfuric acid electrolytic solution bath and electrolyzed to form an oxide coating (alumite) on the surfaces of the aluminum alloy elements.

The surface of the sample was washed with water and then dried.

(Color Tone Evaluation)

For each sample of Test Examples 1 to 3, a*, b*, and L* in the CIELAB color space as defined in JIS Z 8781-4 (2013) were determined for one surface of the element of the slide fastener chain after the treatment, under conditions of 0 to 40° C. and 85% RH using a colorimeter RTC-21 from Ikegami Tsushinki Co., Ltd. As a light source, LED illumination was used.

Also, the appearance of each sample of Test Examples 1 to 3 was visually observed to evaluate what kind of color it looked like. The appearance of each base material of Test Examples 2 and 3 is a silver color similar to that of Test Example 1.

(Evaluation of Average Thickness of Chemical Conversion Coating)

An average thickness of each test sample in a region satisfying hue ranges of −3≤a*≤12; −5≤b*≤35; and 45≤L*≤80 in the CIELAB color space defined in JIS Z 8781-4 (2013) was evaluated by the following method. First, the cross section of the chemical conversion coating in the region satisfying the hue ranges was polished by a conventional method, and then observed with a scanning electron microscope (SEM), and arbitrary five points were selected at equal intervals (a distance of 0.1 μm from each other). Subsequently, the thicknesses of the chemical conversion coating at the five points were measured, and its average value was calculated and determined to be the average thickness in the region satisfying the hue ranges.

[Component Evaluation of Chemical Conversion Coating]

For each test sample, the content of manganese in the chemical conversion coating was evaluated by the following method. First, each test sample was processed into thin pieces by focused ion beam (FIB) processing, and then subjected to compositional analysis with energy dispersive X-ray spectrometry (EDX); GENESIS from AMETEK Co., Ltd.) of a scanning transmission electron microscope (STEM; HD-2300A from Hitachi High-Tech Corporation; an acceleration current of 200 kV).

Table 1 shows test conditions and evaluation results for each test example.

aluminum, and performing a pore-sealing treatment. The chemical conversion coating formed on the aluminum alloy fastening member according to an embodiment is characterized in that the chemical conversion coating is not formed on the alumite coating. Therefore, when the chemical conversion treatment was applied to the slide fastener chain having the elements formed from the deformed wire after the alumite treatment, a slide fastener chain was obtained which included elements in which the chemical conversion coating was not formed on the leg portion having the alumite coating, and the chemical conversion coating was formed on the engaging head portion having no alumite coating. In this case, the alumite coating and the chemical conversion coat-

TABLE 1

| Test Nos. | Alloy Composition of Sample (% by mass) | Treatment Temperature × Treatment Time: pH | a* | b* | L* | Appearance | Average Thickness of Chemical Conversion Coating (μm) | Composition of Chemical Conversion Coating (% by mass) |
|---|---|---|---|---|---|---|---|---|
| Test Example 1 | Al: Balance Si: 0.3 Mg: 4.5-5.6 Cu: 0.1 | 50° C. × 120 sec: pH 10.0 | 1.7 | 14.1 | 65.9 | Bronze | 0.05 | Al: 8 Mn: 25 O: Balance |
|  |  | 50° C. × 240 sec: pH 10.5 | 1.6 | 17.2 | 57.2 |  | 0.07 | Al: 8 Mn: 27 O: Balance |
|  |  | 50° C. × 240 sec: pH 11.0 | 2.4 | 18.0 | 65.3 |  | 0.11 | Al: 9 Mn: 24 O: Balance |
|  |  | 50° C. × 60 sec: pH 11.5 | 1.2 | 13.5 | 56.9 |  | 0.05 | Al: 10 Mn: 24 O: Balance |
| Test Example 2 | Al: Balance Si: 0.3 Mg: 4.5-5.6 Cu: 0.1 | 60° C. × 60 sec: pH 11.0 | 3.5 | 21.7 | 53.1 | Bronze | 0.17 | Al: 9 Mn: 18 O: Balance |
|  |  | 60° C. × 60 sec: pH 12.0 | 1.2 | 13.5 | 59.0 |  | 1.7 | Al: 7 Mn: 18 O: Balance |
| Test Example 3 | Al: balance Si: 0.3 Mg: 4.5-5.6 Cu: 0.1 | 30° C. × 120 sec: pH 10.0 | 0.8 | 5.2 | 72.2 | Silver | Detection Limit or less | Al: 45 O: 55 |

[Evaluation Results]

It was confirmed that Test Examples 1 and 2 which were treated with the above metal coloring solution for chemical conversion treatment had a chemical conversion coating containing manganese as a component element, and a colored coating could be formed on the surface of each sample. In addition, the Bronze as used herein may also be expressed as antique gold.

Any desirable appearance was not obtained for Test Example 3 in which manganese was not contained as a component element of the chemical conversion coating.

(Variation)

In Test Examples 1 and 2 as shown in Table 1, the slide fastener chain having elements after the final molding was immersed in the metal coloring solution for chemical conversion treatment, so that the entire element had the same color tone in the visual observation. By the way, when an alumite treatment is performed in the state of the deformed wire, an alumite coating will be formed only on the side surface of the deformed wire, so that the element made from the deformed wire has the alumite coatings on the leg portion, and no alumite coating is provided on the engaging head that is press-formed after the cutting. The alumite coating is colored by adsorbing a dye or a metal salt on a honeycomb-shaped porous coating formed by anodizing ing having different colors can provide a slide fastener chain having an excellent design including elements having two-colored coatings.

[Coloring Test for Fastener Chain]

Test Example 4

As samples of Test Example 4, a slide fastener chain obtained by attaching A5056 aluminum alloy elements as defined in JIS H 4040: 2015 to fastener tapes made of plurality of threads was prepared. The size of each aluminum alloy element on the surface where the fastener tape extended was 4.0 mm$^2$.

The surface of the sample was then degreased and washed with water in this order.

A bath containing a metal coloring solution for chemical conversion treatment having a solution composition of 30 g/L of potassium permanganate was prepared, and the pH was adjusted to the value shown in Table 2. Pure water was used as the aqueous medium of the metal coloring solution for chemical conversion treatment.

The sample was then immersed in the metal coloring solution for chemical conversion treatment in a state where the metal coloring solution in the bath was controlled at the temperature as shown in Table 2. After immersion for the time shown in Table 2, the sample was removed.

Subsequently, the surface of the sample was washed with water and then dried.

Two samples were prepared by the above procedure, and each of the fastener tapes of the two samples was subjected to composition analysis by XPS (Quantera II; X-ray source; monochromatic Al (1486.6 eV); beam diameter of 100 μm; 25 W; TOA 45°; measured with a neutralized electron gun and Ar monomer ion), and quantitative analysis by ICP-OES (5 ml of nitrate was added to 0.1 g of each sample and decomposed by microwave, and the volume was adjusted to 50 ml and measured by standard correction in Y). Table 2 shows an average value of amounts of manganese elements remaining in the fastener tape as a test result.

Test Example 5

As samples of Test Example 5, a slide fastener chain obtained by attaching the same aluminum alloy elements as those of Test Example 4 to the same fastener tapes as those of Test Example 4 was prepared. The size of each aluminum alloy element on the surface where the fastener tape extended was 4.0 mm².

The surface of the sample was then degreased and washed with water in this order.

A bath containing a metal coloring solution for chemical conversion treatment having a solution composition of 30 g/L of potassium permanganate was prepared, and the pH was adjusted to the value shown in Table 2. Pure water was used as the aqueous medium of the metal coloring solution for chemical conversion treatment.

The sample was then immersed in the metal coloring solution for chemical conversion treatment in a state where the metal coloring solution in the bath was controlled at the temperature as shown in Table 2. After immersion for the time shown in Table 2, the sample was removed.

Subsequently, the surface of each sample was washed with water and then dried.

Two samples were prepared by the above procedure, and each of the fastener tapes of the two samples was subjected to composition analysis by XPS and quantitative analysis by ICP-OES. Table 2 shows an average value of amounts of manganese elements remaining in the fastener tape as a test result.

Test Example 6

As samples of Test Example 6, a slide fastener chain obtained by attaching the same aluminum alloy elements as those of Test Example 4 to the same fastener tapes as those of Test Example 4 was prepared. The size of each aluminum alloy element on the surface where the fastener tape extended was 4.0 mm².

The surface of the sample was then degreased and washed with water in this order.

It should be noted that the slide fastener chain of Test Example 6 was not treated with the metal coloring solution.

Two samples were prepared by the above procedure, and each of the fastener tapes of the two samples was subjected to composition analysis by XPS and quantitative analysis by ICP-OES. Table 2 shows an average value of amounts of manganese elements remaining in the fastener tape as a test result.

TABLE 2

| Test Nos. | Treatment Temperature × Treatment time: pH | Mn [ppm] |
|---|---|---|
| Test Example 4 | 40° C. × 120 sec: pH 11.5 | 51 |
| Test Example 5 | 70° C. × 240 sec: pH 2 | 1600 |
| Test Example 6 | Base Material | less than 5 |

[Evaluation Results]

In Test Example 4 treated with the above metal coloring solution for chemical conversion treatment, the amount of manganese remaining in the fastener tape was 51 ppm. Therefore, the residual manganese in the fastener tape could be satisfactorily suppressed.

On the other hand, in Test Example 5 that carried out the conventional acidic coloring treatment, the amount of manganese remaining in the fastener tape was 1600 ppm. Therefore, the residual manganese in the fastener tape could not be suppressed.

DESCRIPTION OF REFERENCE NUMERALS 1 fastener tape
2 core portion
3 element
4 upper stopper
5 lower stopper
6 slider
7 fastener chain (slide fastener chain)
10 slide fastener

The invention claimed is:

1. An aluminum alloy fastening member comprising a chemical conversion coating containing manganese as a component element,
wherein the chemical conversion coating satisfies hue ranges of $0 \leq a^* \leq 10$, $5 \leq b^* \leq 18$, and $45 \leq L^* \leq 60$ in a CIELAB color space as defined by JIS Z 8781-4 (2013), and
wherein the aluminum alloy has a composition represented by a general formula $Al_x Si_y Mg_c$, in which:
each of x, y, and c is % by mass;
symbol x is a balance;
$0.1 \leq y \leq 1.5$;
$4.5 \leq c \leq 5.6$; and
unavoidable impurities are configured to be contained,
wherein the aluminum alloy fastening member comprises a clear coating on the chemical conversion coating, and
wherein the clear coating has an average thickness of 1.7 μm or more and 36.5 μm or less.

2. The aluminum alloy fastening member according to claim 1, wherein the chemical conversion coating comprises a manganese element in an amount of more than 0% by mass and 35% by mass or less.

3. The aluminum alloy fastening member according to claim 1, wherein the chemical conversion coating has an average thickness of 0.05 μm or more and 3.00 μm or less.

4. The aluminum alloy fastening member according to claim 1, wherein the aluminum alloy fastening member is an element for slide fastener, a slider for slide fasteners, a stopper for slide fasteners, or a button.

5. A fastener chain, comprising:
the aluminum alloy fastening member according to claim 1; and
fastener tapes made of a plurality of threads,
wherein the aluminum alloy fastening member is an element for a slide fastener, and the elements for slide fasteners are attached to the fastener tapes, and wherein an amount of a manganese element remaining in the fastener tapes is less than 90 ppm.

6. A method for producing the aluminum alloy fastening member according to claim 1, comprising a step of forming a chemical conversion coating containing manganese as a component element by immersing the aluminum alloy fastening member in a metal coloring solution for chemical conversion treatment, the metal coloring solution comprising permanganic acid or a salt thereof, and one or both of an inorganic acid and a salt thereof, and a condensed phosphate.

7. The method for producing the aluminum alloy fastening member according to claim 6, wherein the permanganate or the salt thereof is permanganic acid, sodium permanganate, potassium permanganate, zinc permanganate, magnesium permanganate, calcium permanganate, ammonium permanganate, or a combination thereof.

* * * * *